United States Patent
Wehrmann et al.

(10) Patent No.: US 9,139,730 B2
(45) Date of Patent: Sep. 22, 2015

(54) (CO)POLYCARBONATES WITH IMPROVED OPTICAL PROPERTIES

(75) Inventors: Rolf Wehrmann, Krefeld (DE); Helmut Werner Heuer, Leverkusen (DE)

(73) Assignee: Bayer MaterialScience AG (DE)

( * ) Notice: Subject to any disclaimer, the term of this patent is extended or adjusted under 35 U.S.C. 154(b) by 724 days.

(21) Appl. No.: 13/258,508

(22) PCT Filed: Mar. 18, 2010

(86) PCT No.: PCT/EP2010/001714
§ 371 (c)(1),
(2), (4) Date: Sep. 22, 2011

(87) PCT Pub. No.: WO2010/108626
PCT Pub. Date: Sep. 30, 2010

(65) Prior Publication Data
US 2012/0022204 A1    Jan. 26, 2012

(30) Foreign Application Priority Data
Mar. 26, 2009 (DE) .......................... 10 2009 015 040

(51) Int. Cl.
*C08L 69/00* (2006.01)
*C08L 33/24* (2006.01)
*C08L 33/08* (2006.01)

(52) U.S. Cl.
CPC ................. *C08L 69/00* (2013.01); *C08L 33/08* (2013.01); *C08L 33/24* (2013.01)

(58) Field of Classification Search
CPC ..... C08L 69/00; C08L 2666/04; C08L 33/08; C08L 33/24
USPC ................................... 524/508; 525/147, 148
See application file for complete search history.

(56) References Cited

U.S. PATENT DOCUMENTS

| | | | |
|---|---|---|---|
| 2,964,794 A | 12/1960 | Peilstoecker et al. | |
| 3,553,167 A | 1/1971 | Schnell et al. | |
| 4,075,173 A | 2/1978 | Maruyama et al. | |
| 4,185,009 A * | 1/1980 | Idel et al. | 524/165 |
| 4,311,823 A | 1/1982 | Imai et al. | |
| 5,096,968 A | 3/1992 | Sasaki et al. | |
| 5,124,403 A * | 6/1992 | Sasaki et al. | 525/67 |
| 5,225,496 A * | 7/1993 | Yamamoto et al. | 525/330.5 |
| 2003/0173546 A1* | 9/2003 | Hiroshi et al. | 252/500 |
| 2007/0213452 A1* | 9/2007 | Kawato et al. | 524/502 |
| 2013/0001825 A1* | 1/2013 | Schultes et al. | 264/255 |

FOREIGN PATENT DOCUMENTS

| | | |
|---|---|---|
| DE | 1031507 B | 6/1958 |
| DE | 1 137 167 B | 9/1962 |
| DE | 1 495 626 B1 | 6/1971 |
| DE | 1785137 A1 | 1/1972 |
| DE | 2 232 877 A1 | 1/1974 |
| DE | 2 703 376 A1 | 8/1977 |
| DE | 2714544 A1 | 10/1977 |
| DE | 2 701 173 A1 | 7/1978 |
| DE | 3 000 610 A1 | 7/1980 |
| DE | 3832396 A1 | 2/1990 |
| EP | 0089801 A1 | 9/1983 |
| EP | 0363608 A1 | 4/1990 |
| EP | 0 640 655 A2 | 3/1995 |
| EP | WO 2008/155149 * | 12/2008 |
| GB | 905072 A | 9/1962 |
| GB | 1552558 A | 9/1979 |
| GB | 1592724 A | 7/1981 |
| WO | WO-99/55772 A1 | 11/1999 |
| WO | WO 2007/140100 * | 12/2007 |
| WO | WO-2007/140100 A1 | 12/2007 |

* cited by examiner

*Primary Examiner* — Liam J Heincer
(74) *Attorney, Agent, or Firm* — Drinker Biddle & Reath LLP

(57) ABSTRACT

The invention relates to (co)polycarbonate compositions and molding compositions which feature improved optical properties, good flowability, and high heat resistance.

9 Claims, No Drawings

(CO)POLYCARBONATES WITH IMPROVED OPTICAL PROPERTIES

CROSS-REFERENCE TO RELATED APPLICATIONS

This application is a national stage application (under 35 U.S.C. §371) of PCT/EP2010/001714, filed Mar. 18, 2010, which claims benefit of German application 10 2009 015 040.4, filed Mar. 26, 2009, both of which are incorporated herein by reference in their entirety for all their useful purposes.

BACKGROUND

The present invention relates to (co)polycarbonate compositions and molding compositions which feature improved optical properties, good flowability, and high heat resistance.

(Co)polycarbonates are engineering thermoplastics. They are used in many different applications in the electrical and electronic sector, as housing material for lamps, and in applications which demand not only particular thermal and mechanical properties but also excellent optical properties, examples being hairdryers, automobile sector applications, plastics covers, diffuser sheets, and optical conductor elements, and also lamp covers, or bezels.

Said applications practically always have an essential requirement for good thermal and mechanical properties, such as Vicat point (heat resistance) and glass transition temperature. Excellent optical properties are at the same time extremely important. Heat resistance is achieved by utilizing specific bisphenols. This method cannot achieve a simultaneous improvement in optical properties.

It is known that polyacrylates and (co)polycarbonates are not compatible in blends. This is apparent in increased haze, extending as far as opacity. There is also adverse effect on thermal and mechanical properties.

It was therefore an object to develop aromatic (co)polycarbonates with improved optical properties, without any change in core properties, in particular mechanical and thermal properties.

DESCRIPTION OF PREFERRED EMBODIMENTS

Surprisingly, it has been found that a composition comprising (co)polycarbonate and polymers having specific acrylate structures gives improved optical properties. This measure for achieving a controlled increase in the level of optical properties, and adjustment thereof, and dependency on the admixed polymer, was not known hitherto.

The invention provides mixtures made of

A) from 99.98 to 99.5 parts by weight, preferably from 99.9 to 99.7 parts by weight, (based on the entirety of components A+B) of high-molecular-weight, thermoplastic, aromatic (co)polycarbonate with molar mass M (weight average) of at least 10 000 g·mol$^{-1}$, preferably from 20 000 g·mol$^{-1}$ to 30 000 g·mol$^{-1}$, which comprises structural units of the formula (I)

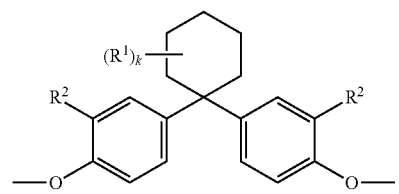

in which
$R^1$ and $R^2$ are hydrogen, $C_1$-$C_4$-alkyl, preferably methyl,
k is 0, 1, 2, 3 or 4, preferably 2 or 3, B) from 0.02 to 0.5 part by weight, preferably from 0.1 to 0.3 part by weight, (based on the entirety of components A+B) of one or more polyacrylates comprising at least one structural unit of the general formulae (II) or (III):

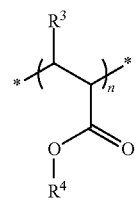

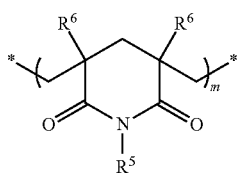

in which
$R^3$ is $C_1$-$C_8$ alkyl, preferably methyl,
$R^4$ is C1-C6 alkyl, preferably methyl
$R^5$ is hydrogen, $C_1$-$C_8$ alkyl, preferably hydrogen and methyl, and
$R^6$ is hydrogen, $C_1$-$C_4$ alkyl, preferably methyl,
m and n are integers determined via the molecular weight and the molar ratio of the structures (II) and (III) is from 0 mol % to 100 mol %, based on the total number of moles of (II) and (III), and the entirety of the structures (II) and (III) gives 100 mol %,
where all of the parts-by-weight data in the present application have been standardized so that the entirety of the parts by weight of components A+B in the composition is 100.

The following can optionally be present: further additives, such as UV absorbers, mold-release auxiliaries, or heat stabilizers, in amounts which are respectively from 50 to 5000 ppm, based on the entirety of components A+B.

Extrudants or injection moldings produced from the (co)polycarbonate compositions and (co)polycarbonates of the invention have significantly improved optical properties (Yellowness Index) but at the same time have almost unaltered mechanical, thermal, and rheological properties. This is an important criterion for the optical, mechanical, and thermal performance of the injection-molded or extruded component.

For the purposes of the present invention, thermoplastic, aromatic (co)polycarbonates are either homopolycarbonates or copolycarbonates composed of various diphenol units, where the term (co)polycarbonate in the present application also subsumes homopolycarbonates made of diphenol units of the formula (V).

Aromatic (co)polycarbonates suitable in the invention are known from the literature or can be produced by processes known from the literature (see by way of example Schnell, "Chemistry and Physics of Polycarbonates", Interscience Publishers, 1964 and also DE-B 1 495 626, DE-A 2 232 877, DE-A 2 703 376, DE-A 2 714 544, DE-A 3 000 610, DE-A 3 832 396 for the production of aromatic (co)polycarbonates).

Aromatic (co)polycarbonates are produced by way of example via reaction of diphenols with carbonyl halides, preferably phosgene by the interfacial process, optionally with use of chain terminators, for example monophenols, and optionally with use of trifunctional or more than trifunctional branching agents, for example triphenols or tetraphenols. Another possible production route uses a polymerization process in the melt via reaction of diphenols with, for example, diphenyl carbonate.

Other than the diphenols of the formula (V)

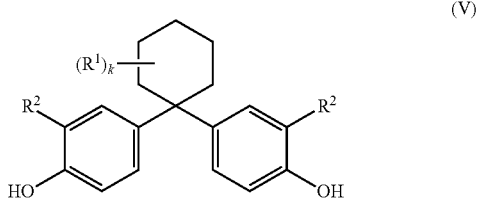

(V)

in which
$R^1$ and $R^2$ are hydrogen, $C_1$-$C_4$-alkyl, preferably methyl,
k is 0, 1, 2, 3 or 4, preferably 2 or 3,
dihydroxyaryl compounds suitable for producing the (co)polycarbonates are those of the formula (VI)

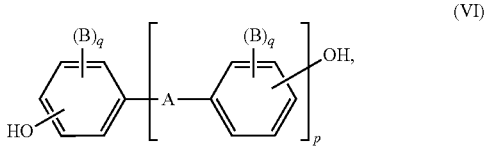

(VI)

where
A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, onto which further aromatic rings optionally comprising heteroatoms can have been fused,
or a moiety of the formulae (VII) or (VIII)

(VII)

(VIII)

B is respectively hydrogen, $C_1$ to $C_{12}$-alkyl, preferably methyl, halogen, preferably chlorine and/or bromine, q is respectively mutually independently 0, 1 or 2,
p is 1 or 0, and
$R^7$ and $R^8$ are individually selectable for each X', being mutually independently hydrogen or $C_1$ to $C_6$-alkyl, preferably hydrogen, methyl, or ethyl,
$X^1$ is carbon, and
r is an integer from 4 to 7, preferably 4 or 5, with the proviso that at at least one atom $X^1$, $R^7$ and $R^8$ are simultaneously alkyl.

It is preferable to use 1,1-bis(4-hydroxyphenyl)-3,3,5-trimethylcyclohexane (bisphenol TMC) as diphenol derived from formula (V) for producing the (co)polycarbonates of the invention.

Examples of suitable diphenols of the formula (VI) for producing the (co)polycarbonates to be used in the invention are hydroquinone, resorcinol, bis(hydroxyphenyl)alkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'bis(hydroxyphenyl)diisopropylbenzenes, and also the (ring-)alkylated and ring-halogenated compounds derived from these.

Preferred other diphenols are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane, 2,4-bis(4-hydroxyphenyl)-2-methylbutane, 1,3-bis[2-(4-hydroxy-phenyl)2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis [2-(3,5-dimethyl-4-hydroxyphenyl)-2-propyl]benzene.

Particularly preferred diphenols are 2,2-bis(4-hydroxyphenyl)propane (BPA), and 2,2-bis(3-methyl-4-hydroxyphenyl)propane (dimethylBPA).

Particular preference is given to (co)polycarbonates made of bisphenol A and bisphenol TMC.

The diphenols can be used individually or in the form of any desired mixtures. The diphenols are known from the literature or can be obtained by processes known from the literature.

These and other suitable diphenols are available commercially and are described by way of example in "H. Schnell, Chemistry and Physics of Polycarbonates, Interscience Publishers, New York 1964, pp. 28 ff; pp. 102 ff", and in "D. G. Legrand, J. T. Bendier, Handbook of Polycarbonate Science and Technology, Marcel Dekker New York 2000, pp. 72 ff.".

Particular preference is given to random (co)polycarbonates comprising the following structural units (IX) and (X):

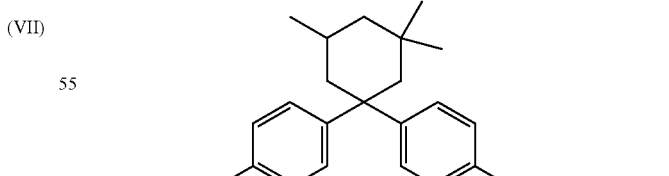

(IX)

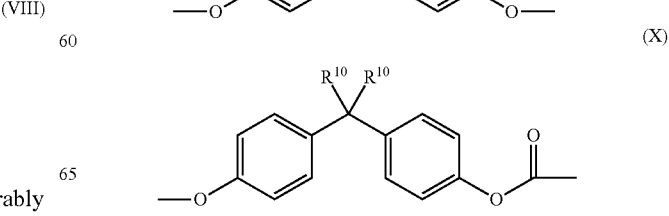

(X)

in which the terminal groups have at least one of the following structures (XI) and (XII):

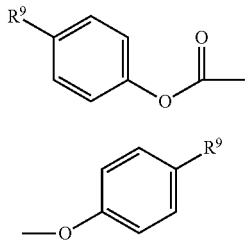

where $R^9$ and $R^{10}$) are mutually independently hydrogen or $C_1$-$C_6$-alkyl. The molar ratio of the structures (IX) or (X) is from 0 mol % to 100 mol %, preferably from 1 mol % to 99 mol %, particularly preferably from 2 mol % to 98 mol %, very particularly preferably from 3 mol % to 97 mol %, based on the total number of moles of (IX) and (X).

Very particular preference is given to random (co)polycarbonates in which $R^{10}$ is methyl.

An example of suitable chain terminators for producing the thermoplastic, aromatic (co)polycarbonates is phenol, p-tert-butylphenol, or cumylphenol.

The amount of chain terminators to be used is generally from 0.5 mol % to 10 mol %, based on the total number of moles of the respective diphenols used.

The thermoplastic, aromatic (co)polycarbonates can have branching in a known manner and specifically preferably via the incorporation of from 0.05 to 2.0 mol %, based on the entirety of the diphenols used, of trifunctional or more than trifunctional compounds, for example compounds having three or more phenolic groups.

In one preferred embodiment of the invention, the weight-average molar mass of the aromatic (co)polycarbonates ($M_w$, measured by way of example via GPC, ultracentrifuge, or scattered-light measurement) is more than 10 000 g·mol$^{-1}$, particularly preferably from 20 000 g·mol$^{-1}$ to 300 000 g·mol$^{-1}$.

The thermoplastic, aromatic (co)polycarbonates can be used alone or in any desired mixture, preferably with further aromatic polycarbonates.

The diphenols used can, and this is also true for all of the other chemicals and auxiliaries added to the synthesis, have contamination by contaminants deriving from the synthesis, handling, and storage of each diphenol. However, it is desirable to use raw materials of maximum purity.

The specific polyacrylates used can be polymethyl methacrylate or heat-resistant polymethacrylimides, such as poly (N-methylmethacrylimide) (PMMI, also termed Pleximid products; Röhm GmbH & Co KG, Darmstadt) or a mixture or copolymer thereof. These have high heat resistance together with very good transmittance, very high strength and stiffness, and good weathering resistance.

The composition can comprise further commercially available polymer additives, such as flame retardants, flame retardants synergists, antidrip agents (for example compounds from the following classes of substance: fluorinated polyolefins, silicones, and aramid fibers), lubricants and mold-release agents (such as pentaerythritol tetrastearate), nucleating agents, stabilizers, antistatic agents (such as carbon fibers, carbon nanotubes, conductive carbon blacks, and also organic antistatic agents, such as polyalkylene ethers, alkylsulfonates or polyamide-containing polymers), and also dyes and pigments, in amounts which do not impair the mechanical properties of the composition to the extent that it no longer complies with the required property profile (avoidance of brittle fracture –10° C.).

Flame retardants used preferably comprise phosphorus-containing flame retardants, in particular selected from the groups of the mono- and oligomeric phosphoric and phosphonic esters, phosphonate amines, and phosphazenes, but it is also possible here to use, as flame retardants, mixtures of a plurality of components selected from one or more of these groups. Phosphorus compounds not specifically mentioned here, preferably halogen-free, can also be used, alone or in any desired combination with other, preferably halogen-free, phosphorus compounds. Examples of suitable phosphorus compounds are: tributyl phosphate, triphenyl phosphate, tricresyl phosphate, diphenyl cresyl phosphate, diphenyl octyl phosphate, diphenyl 2-ethyl cresyl phosphate, tri-(isopropylphenyl) phosphate, resorcinol-bridged di- or oligophosphate, and bisphenol-A-bridged di- or oligophosphate. Particular preference is given to the use of oligomeric phosphoric esters which derive from bisphenol A. Phosphorus compounds suitable as flame retardants are known (cf. e.g. EP-A 0 363 608, EP-A 0 640 655) or can be produced analogously by known methods (e.g. Ullmanns Enzyklopädie der technischen Chemie [Ullmann's encyclopedia of Industrial Chemistry], vol. 18, pp. 301 ff. 1979; Houben-Weyl, Methoden der organischen Chemie [Methods of Organic Chemistry], vol. 12/1, p. 43; Beilstein vol. 6, p. 177).

The addition of additives serves to prolong the service lifetime or to increase color fastness (stabilizers), to simplify processing (e.g. mold-release agents, flow aids, antistatic agents), or to adjust the properties of the polymer appropriately for particular types of stress (impact modifiers, such as rubbers; flame retardants, colorants, glass fibers).

Said additives can be added individually or in any desired mixtures or in a plurality of different mixtures to the polymer melt, and specifically directly during the isolation of the polymer or else after melting of granulated material in what is known as a compounding step. The additives or mixtures of these here can be added in the form of solid, i.e. in the form of powder, or in the form of melt to the polymer melt. Another type of metering uses masterbatches or mixtures of masterbatches of the additives or additive mixtures.

Suitable additives are described by way of example in "Additives for Plastics Handbook, John Murphy, Elsevier, Oxford 1999", or in "Plastics Additives Handbook, Hans Zweifel, Hanser, Munich, 2001", or in WO 99/55772, pp. 15-25.

Preferred heat stabilizers are tris(2,4-di-tert-butylphenyl) phosphite (Irgafos 168), tetrakis(2,4-di-tert-butylphenyl) [1,1-biphenyl]-4,4'-diylbisphosphonite, trisoctyl phosphate, octadecyl 3-(3,5-di-tert-butyl-4-hydroxyphenyl)propionate (Irganox 1076), bis(2,4-dicumylphenyl) pentaerythritol diphosphite (Doverphos S-9228-PC), bis(2,6-di-tert-butyl-4-methylphenyl) pentaerythritol diphosphite (ADK STAB PEP-36), or triphenylphosphine. They are used alone or in a mixture (e.g. Irganox B900 or Doverphos S-9228-PC with Irganox B900 or, respectively, Irganox 1076).

Preferred suitable mold-release agents are pentaerythritol tetrastearate, glycerol monostearate, stearyl stearate, or propanediol mono- or distearate. They are used alone or in a mixture.

Preferred suitable UV stabilizers are 2-(2'-hydroxyphenyl) benzotriazoles, 2-hydroxybenzophenones, esters of substituted and unsubstituted benzoic acids, acrylates, sterically hindered amines, oxamides, 2-(2-hydroxyphenyl)-1,3,5-triazines, and particular preference is given to substituted benztriazoles, such as Tinuvin 360, Tinuvin 350, Tinuvin 234, Tinuvin 329 or UV CGX 006 (Ciba).

Colorants can also be added, examples being organic dyes or pigments, or inorganic pigments or IR absorbers, individually, in a mixture, or else in combination with stabilizers, with (hollow) glass beads, or with inorganic fillers; other examples are organic or inorganic scattering pigments.

The thermoplastic molding compositions of the invention are produced by mixing the respective constituents in a known manner and, at temperatures of from 200° C. to 340° C., preferably from 240° C. to 300° C., and in conventional assemblies, such as internal kneaders, extruders, and twin-screw systems, compounding them in the melt and extruding them in the melt.

The mixing of the individual constituents can take place in a known manner either in succession or else simultaneously, and specifically either at about 20° C. (room temperature) or at a higher temperature.

The invention further provides the use of polyacrylates comprising at least one structural unit of the general formulae (II) or (III) in a process for producing (co)polycarbonates comprising at least one diphenol unit of the formula (I),

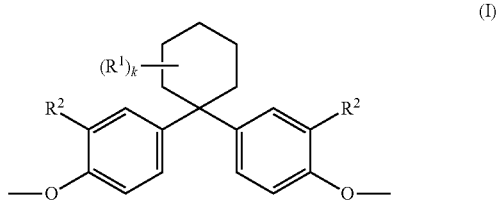

(I)

in which
  $R^1$ and $R^2$ are hydrogen, $C_1$-$C_4$-alkyl,
  k is 0, 1, 2, 3 or 4,
  where the polyacrylate(s) is/are admixed with the (co)polycarbonate.

The invention also provides processes for producing the molding compositions, and the use of the molding compositions for producing moldings.

The molding compositions of the invention can be used for producing moldings of any type. These can be produced, for example, via injection molding, extrusion, and blow molding processes. Another type of processing is the production of moldings via thermoforming from previously produced sheets or foils.

The (co)polycarbonate compositions and (co)polycarbonates of the invention can be processed conventionally in conventional machinery, for example in extruders or injection molding machines, to give any desired moldings, or to give foils and foil laminates, or sheets, or bottles.

The resultant (co)polycarbonates can be used to produce extrudants (sheets, foils, and laminates of these; e.g. for card applications and pipes) and moldings (bottles), in particular those for use in the transparent sector, particularly in the sector of optical applications, e.g. sheets, sandwich panels, glazing, diffuser panels, or protective screens, lamp covers, plastics cover panels, optical conductor elements, or optical data storage systems, such as audio CD, CD-R(W), DVD, DVD-R(W), minidisks, in the various embodiments of these which are readable-only or else are (re)writable, and also data carriers. They can also be used for producing articles for the electrical and electronics sector and the IT sector.

The (co)polycarbonate compositions are in particular used for producing compounded materials and for producing blends and components in which optical, thermal, and mechanical properties are utilized, examples being housings, articles in the electrical and electronics sector, e.g. plugs, switches, boards, lamp holders, lamp covers, in the automobile sector, e.g. lamp holders and lamp covers, and glazing, in the medical sector, e.g. dialyzers, connectors, valves, packaging, e.g. bottles, containers, lenses, collimators, light-emitting diodes, or diffuser sheets for displays and other applications.

The extrudates and moldings made of the polymers of the invention are likewise provided by the present application.

Other possible applications of the (co)polycarbonate molding compositions of the invention are: safety/security panels which are known to be required in many sectors of buildings, of vehicles, and of aircraft, and also in the form of protective screens on helmets, production of extruded or solution-derived foils for displays or electric motors, and also ski foils, production of blown products, such as water bottles (see by way of example U.S. Pat. No. 2,964,794), production of translucent sheets, in particular of panels having cavities, for example for the protective covering of buildings, such as railroad stations, greenhouses, and lighting systems, for producing traffic-signal housings or traffic signs, for producing foams (see by way of example DE-B 1 031 507), for producing filaments and wires (see by way of example DE-B 1 137 167 and DE-A 1 785 137), in the form of translucent plastics with glass fiber content for lighting purposes (see by way of example DE-A 1 554 020), and for producing small precision-engineered injection molded parts, such as lens holders. (Co)polycarbonates used here have glass fiber content and also optionally comprise about 1 to 10% by weight of $MoS_2$, based on total weight. Examples of other optical applications are optical storage systems (CD, DVD), protective goggles or lenses for photographic and film cameras (see by way of example DE-A 2 701 173), light transmitters, in particular in the form of optical conductor cables (see by way of example EP-A1 0 089 801) in the form of electrical insulation materials for electrical conductors, and for plug housings, and also plug connectors, in the form of carrier material for organic photoconductors, for producing lamps, e.g. headlamps, or in the form of light-diffuser panels or lamp covers, or for medical applications, examples being oxygenators and dialyzers, or for food-and-drink applications, e.g. bottles, tableware, and chocolate molds, or for applications in the automobile sector where contact with fuels and lubricants can occur, or for sports items, e.g. slalom poles, or for household items, e.g. kitchen sink units and mailbox housings, or for housings, examples being electrical distribution cabinets, electrical equipment, household equipment, components of household items, of electrical devices, and of electronic devices, or for producing motorcycle helmets and protective helmets, or for automobile items, for example glazing, dashboards, bodywork parts, and shock absorbers. The examples below serve for further explanation of the invention.

EXAMPLES

The following raw materials were used for producing the compounded materials:
  A 2000 nat.: copolycarbonate made of bisphenol TMC and BPA from Bayer MaterialScience AG, Leverkusen, with MVR 5.3 cm$^3$/10 min (330° C., 2.16 kg) and with Vicat point 205° C.

Pleximid 8813: poly(N-methacrylimide) from Röhm GmbH & Co KG, Darmstadt, with MVR 20 cm$^3$/10 min (260° C., 10 kg) and Vicat point 130° C.

Pleximid 8817: poly(N-methacrylimide) from Röhm GmbH & Co KG, Darmstadt, with MVR 1 cm$^3$/10 min (260° C., 10 kg) and Vicat point 170° C.

A multiscrew extruder is used to produce various test mixtures of the two Pleximid grades with Apec 2000 as main copolycarbonate (see table 1).

The resultant blends were used for injection molding of color sample plaques (thickness 4 mm), and these were subjected to optical characterization in terms of transmittance, haze, and YI (Yellowness Index). For control purposes, the mechanical and thermal properties of the blends are subjected to the conventional tests, e.g. Vicat point, HDT, tensile test, modulus of elasticity, and impact resistance, using Apec 2000 without additives. Table 1 below compares the collation of all of the properties with the comparative example (specimen without additives).

TABLE 1

|  |  | 1* | 2 | 3 | 4 | 5* | 6 | 7 | 8 | 9* |
|---|---|---|---|---|---|---|---|---|---|---|
| A. 2000 nat | % | 100 | 99.9 | 99.75 | 99.5 | 98 | 99.9 | 99.75 | 99.5 | 98 |
| Pleximid 8813 | % | — | 0.1 | 0.25 | 0.5 | 2.0 | — | — | — | — |
| Pleximid 8817 | % | — | — | — | — | — | 0.1 | 0.25 | 0.5 | 2.0 |
| Rheology |  |  |  |  |  |  |  |  |  |  |
| Tg | ° C. | 205.8 | 206.0 | 206.9 | 205.0 | 205.4 | 206.4 | 204.5 | 206.1 | 206.3 |
| MVR 330° C./2.16 kg | ml/10 min | 5.3 | 5.6 | 5.7 | 5.8 | 7.7 | 5.7 | 5.9 | 6 | 7.2 |
| IMVR20' 330° C./2.16 kg | ml/10 min | 5.4 | 6 | 5.8 | 7 | 8.8 | 5.6 | 6 | 6.9 | 8.1 |
| Delta MVR/IMVR20' |  | 0.1 | 0.4 | 0.1 | 1.2 | 1.1 | −0.1 | 0.1 | 0.9 | 0.9 |
| Vicat VST B 120 | ° C. | 204.9 | 204.2 | 204.0 | 203.3 | 202.1 | 204.0 | 204.1 | 203.8 | 203.5 |
| HDT A | ° C. | 176.9 | 175.7 | 176.0 | 175.2 | 173.9 | 175.8 | 176.0 | 175.8 | 175.5 |
| HDT B | ° C. | 194.9 | 194.3 | 194.2 | 193.4 | 192.4 | 194.3 | 194.3 | 194.2 | 193.4 |
| Tensile test |  |  |  |  |  |  |  |  |  |  |
| Yield stress | N/mm$^2$ | 75 | 75 | 75 | 76 | 76 | 75 | 75 | 75 | 76 |
| Tensile strain at yield | % | 6.9 | 6.8 | 6.8 | 6.7 | 6.7 | 6.7 | 6.7 | 6.7 | 6.7 |
| Ultimate tensile strength | N/mm$^2$ | 65 | 62 | 61 | 67 | 67 | 62 | 66 | 68 | 68 |
| Tensile strain at break | % | 94 | 92 | 91 | 96 | 99 | 91 | 95 | 97 | 100 |
| Modulus of elasticity | N/mm$^2$ | 2513 | 2520 | 2518 | 2508 | 2568 | 2531 | 2560 | 2541 | 2537 |
| ISO 180/4A + Steep incline |  |  |  |  |  |  |  |  |  |  |
| RT | kJ/m$^2$ | 6 s | 7 s | 7 s | 7 s | 6 s | 7 s | 7 s | 7 s | 6 s |
| Appearance of 4 mm CSP |  | clear transp. | clear transp. | clear transp. | clear transp. | slight haze | clear transp. | clear transp. | clear transp. | slight haze |
| Optical data |  |  |  |  |  |  |  |  |  |  |
| Transmittance |  | 88.8 | 89.0 | 89.1 | 88.6 | — | 89.1 | 88.8 | 88.1 | — |
| Haze |  | 0.4 | 0.4 | 0.3 | 0.5 | — | 0.4 | 0.5 | 0.7 | — |
| Y.I. |  | 6.4 | 6.0 | 6.1 | 6.8 | — | 5.9 | 6.8 | 8.0 | — |

*Comparative example

The favorable effect of the Pleximid products on the optical properties of the compounded materials is clearly seen, while mechanical, thermal, and rheological properties are practically unaltered, up to 0.25% by weight of Pleximid in the Apec. At concentration above 0.25% by weight, in contrast, optical properties become poorer again, and this is apparent from a reduction in transmittance and an increase in haze and YI. The person skilled in the art would not have expected that Pleximid products can give favorable optical properties within a very particular concentration range in Apec.

What is claimed is:

1. A composition comprising
A) from 99.98 to 99.5 parts by weight (based on the entirety of components A+B) of a high-molecular-weight, thermoplastic, aromatic (co)polycarbonate with molar mass M (weight average) of at least 10 000 g·mol$^{-1}$ which comprises structural units of the formula (I)

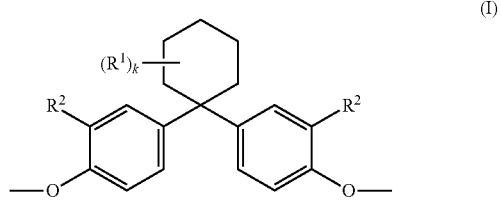

wherein

R$^1$ and R$^2$ represent, independently of one another, hydrogen or a C$_1$-C$_4$-alkyl, k is 0, 1, 2, 3 or 4, B) from 0.02 to 0.5 part by weight (based on the entirety of components A+B) of one or more polyacrylates comprising at least one structural unit of the formula (III):

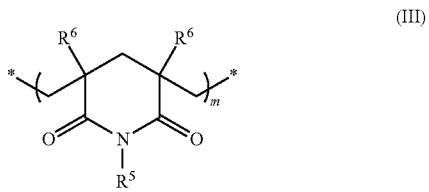

wherein

R$^5$ represents hydrogen or a C$_1$-C$_8$ alkyl,
R$^6$ represents hydrogen or a C$_1$-C$_4$ alkyl,
m is an integer determined via the molecular weight.

2. The composition as claimed in claim 1, wherein the molar mass of the (co)polycarbonate A) is from 20 000 g·mol$^{-1}$ to 300 000 g·mol$^{-1}$.

3. The composition as claimed in claim 1, wherein the composition comprises from 99.9 to 99.7 parts by weight of component A), and from 0.1 to 0.3 part by weight of component B) (based on the entirety of components A+B).

4. The composition as claimed in claim 1, wherein the composition further comprises from 50 to 5000 ppm by weight of additives, based on the entirety of components A+B, and wherein the additives at least one of UV absorbers, mold release auxiliaries, heat stabilizers, and mixtures thereof.

5. The composition as claimed in claim 1, wherein structural units of the formula (I) have the following structure (IX)

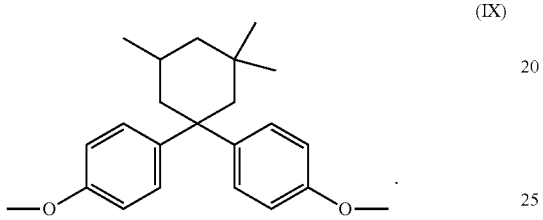
(IX)

6. The composition as claimed in claim 1, wherein the (co)polycarbonate is a random (co)polycarbonate comprising the following structural units (IX) and (X):

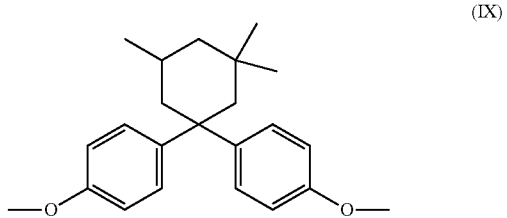
(IX)

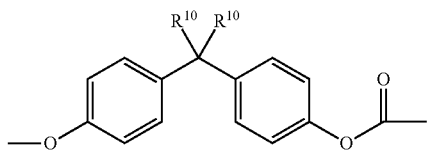
(X)

and wherein the terminal groups have at least one of the following structures (XI) and (XII):

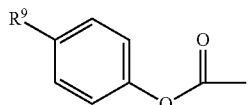
(XI)

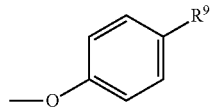
(XII)

wherein

R$^9$ and R$^{10}$ are, independently of one another, hydrogen or a C$_1$-C$_6$-alkyl.

7. The composition as claimed in claim 6, wherein R$^9$ is tert-butyl or hydrogen and R$^{10}$ is methyl, and the molar ratio of the structures (IX) or (X) is from 2 mol % to 98 mol %, based on the total number of moles of (IX) and (X), and the entirety of the structures (IX) and (X) gives 100 mol %.

8. A process for producing the composition as claimed in claim 1, comprising mixing at least components A and B, and at an elevated temperature, compounding the mixture in the melt or, respectively, extruding them in the melt.

9. A molding obtained from compositions as claimed in claim 1.

* * * * *